United States Patent

Welscher et al.

(10) Patent No.: US 10,007,128 B1
(45) Date of Patent: Jun. 26, 2018

(54) METHOD AND DEVICE FOR ESTABLISHING A TARGET DESIGN

(71) Applicant: Carl Zeiss Vision International GmbH, Aalen (DE)

(72) Inventors: Markus Welscher, Rainau (DE); Ralf-Roland Sauer, Hüttlingen (DE); Christoph Winter, Hüttlingen (DE); Ray Steven Spratt, Pentaluma, CA (US)

(73) Assignee: Carl Zeiss Vision International GmbH, Aalen (DE)

( * ) Notice: Subject to any disclaimer, the term of this patent is extended or adjusted under 35 U.S.C. 154(b) by 0 days. days.

(21) Appl. No.: 15/722,706

(22) Filed: Oct. 2, 2017

(51) Int. Cl.
*G06F 3/048* (2013.01)
*G02C 7/06* (2006.01)
*G02C 7/02* (2006.01)

(52) U.S. Cl.
CPC ............. *G02C 7/061* (2013.01); *G02C 7/027* (2013.01); *G02C 7/028* (2013.01)

(58) Field of Classification Search
CPC ........ G06F 3/084; G06F 3/048; G06F 3/0481; G06F 3/04842; G06C 3/00
USPC ................. 351/159.74, 159.73; 715/833, 831
See application file for complete search history.

(56) References Cited

U.S. PATENT DOCUMENTS

| 7,344,245 B2 | 3/2008 | Fisher et al. |
| 7,540,611 B2 | 6/2009 | Welk et al. |
| 8,128,226 B2 | 3/2012 | Guilloux et al. |
| 8,434,025 B2 | 4/2013 | Fisher et al. |
| 2004/0027679 A1 | 2/2004 | Welk et al. |
| 2012/0188504 A1* | 7/2012 | Petignaud .............. G02C 7/024 351/159.74 |

FOREIGN PATENT DOCUMENTS

DE 10140656 A1 3/2003

OTHER PUBLICATIONS

Ophthalmic optics—Spectacle lenses—Vocabulary (ISO 13666:2012); German and English version EN ISO 13666:2012, Oct. 2013.

* cited by examiner

Primary Examiner — Hung Dang
(74) Attorney, Agent, or Firm — Ewers & Hasselmann PLLC

(57) ABSTRACT

A device and a method for establishing a target design are disclosed. A generator generates a graphical representation of a starting target design and displays it on a display. A user directly manipulates a graphical representation of the starting target design displayed on the display through the graphical user interface. The graphical representation of the manipulated starting target design is updated and displayed on the display.

14 Claims, 4 Drawing Sheets

METHOD AND DEVICE FOR ESTABLISHING A TARGET DESIGN

TECHNICAL FIELD

The present disclosure relates to a method for establishing a target design for use in producing a spectacle lens and to a device for performing the method.

BACKGROUND

The optical quality of a spectacle lens, either single vision or progressive, can be improved for the wearer by using freeform surfaces, i.e., surfaces which may freely be formed during the manufacturing process of the spectacle lens and which do not need to show axial symmetry or rotational symmetry. The spectacle lens can be optimized with respect to individual prescription data of the wearer, as well as to individual as-worn position and frame data. Such an optimization requires a target design. The target design typically includes a target distribution of optical aberrations for the wearer, e.g., astigmatic error, power error, prism, possibly higher order errors like coma seen in the beam path running through a spectacle lens, through the pupil and through the eye's center of rotation, and also may include surface properties of the freeform surface, such as surface astigmatism, and includes an assigned power distribution.

Specific target designs are generally connected with a specific lens product. Each lens product may have a number of associated target distributions to accommodate the range of prescription power, addition power, refractive index, and progression length. Currently, the main option that eye care professionals (ECPs) have for satisfying the specific needs of the customer is to rely on product claims and experience; they do not have access to either the target distributions, or the details of the final performance of the produced lens.

It would be desirable for the ECPs to have more control over the optical performance of the spectacle lenses which they provide to their patients. Even products that can be varied, e.g., in progression length/frame size or use/lifestyle profiles, may only roughly fulfill the desired requirements of the spectacle lens. These requirements can be fairly general, such as specifying the relative importance of the various zones; e.g., distance vision zone, intermediate vision zone (progression zone) and near vision zone. However, the requirements can also be more detailed, and include a desired optical power distribution and/or distribution of aberrations for the wearer and/or surface properties of the spectacle lens. In general, it will not be possible to achieve all of the desired, possibly contradictory, properties of the lens, and specifying contradictory properties can result in a lens having optical properties significantly different than intended.

There are several approaches to give the ECP more control over the optical performance of the spectacle lenses which they provide to their patients. For example, U.S. Pat. No. 7,344,245 B2 discloses a method of designing a progressive lens in which the shape of a reference lens is modified by a morphing process based on the wearer's preferred value for one or more design features. U.S. Pat. No. 8,128,226 B2 describes a method for the determination of a progressive lens personalized for a specific frame chosen by a given wearer. In this method, a personalized distribution of the power and the astigmatic error is calculated starting from an initial distribution of the power and the astigmatic error by using a transformation, which is based on the frame chosen by the wearer.

U.S. Pat. No. 8,434,025 B2 discloses a method of designing and/or selecting a progressive addition lens design for a wearer. In an embodiment, the method includes displaying a graphical representation of an initial progressive addition lens design including design parameters having design values. A user interface is provided including, for each of one or more of the design parameters, a control that is adjustable over a range of levels, each level in the range being associated with a corresponding value of the respective design parameter. A control is adjusted to select a level and the selection is processed so as to substantially simultaneously update the displayed graphical representation in accordance with the selected level to provide a modified progressive lens design. A system for designing and/or selecting a progressive addition lens design for a wearer is also disclosed in U.S. Pat. No. 8,434,025 B2. However, the method and the system of U.S. Pat. No. 8,434,025 B2 only allow for adjusting a selection of design parameters over a predetermined range given by the adjustable controls.

Considering the teaching of U.S. Pat. No. 8,434,025 B2 the present disclosure provides a method and device for establishing a target design which method is useful for an ECP in finding a compromise in achieving as many of the desired, possibly contradictory, properties of a spectacle lens as possible. In particular, the proposed method and the proposed device increase the freedom of the ECP in specifying a desired target design as compared to U.S. Pat. No. 8,434,025 B2.

SUMMARY

The present disclosure provides a device for establishing a target design for use in producing a spectacle lens. The device includes a display and a graphical user interface provided on the display, where the graphical user interface allows for specifying a desired target design by a user; a storage unit containing a plurality of target designs; and a selecting device for selecting, out of the plurality of target designs contained in the storage unit, a target design that most closely matches a desired target design specified by the user through the graphical user interface, which is then provided as an established target design.

The graphical user interface allows to specify the desired target design by drawing lines and/or areas on the display and/or by directly manipulating lines and/or areas displayed on the display, which lines and/or areas represent a distribution of at least one property of the desired target design and/or zones of the desired target design. Directly manipulating lines and/or areas displayed on the display means manipulating the lines and/or areas themselves and not manipulating them by changing parameters through a manipulation of adjustable controls which then leads to an amended graphical representation of the lines and/or areas.

The display may be a conventional display on which the graphical user interface displays a manipulative means which allows for drawing lines or areas on the display and/or which allows for selecting and relocating or erasing lines or areas displayed on the display, or parts thereof. The manipulative means may, for example, be a cursor or the like in conjunction with a mouse, a trackball, a trackpad, a joystick, etc. However, the display may also be a touchscreen which allows for drawing lines or areas on the display by means of a drawing device such as a pen or the like or the user's finger and/or which allows for selecting and relocating or erasing lines or areas displayed on the display, or parts thereof, by means of a drawing device such as a pen or the like or by means of a finger.

The graphical user interface may be designed for displaying a starting target design on the display, where the starting target design is represented by lines and/or areas representing a distribution of at least one property of the starting target design and/or zones of the desired target design. In this case, the graphical user interface is designed for directly manipulating the lines and/or the areas of the starting target design displayed on the display, e.g., by manipulating the shape of the lines or areas by relocating, adding or erasing lines and/or by relocating, adding or erasing at least parts of the lines or areas.

Throughout the present disclosure, the following definitions apply:

The term "power" refers to the capacity of a lens or optical surface to change the curvature or direction of incident wavefronts by refraction (see DIN ISO 13666: 2013-10, section 4.10).

The term "progressive-power lens" refers to a spectacle lens with at least one progressive surface that provides increasing power as the wearer looks down (see DIN ISO 13666:2013-10, section 8.3.5). A progressive-power lens includes a near vision zone and a distance vision zone where the terms "near vision zone" and "distance vision zone" refer to that portion of the progressive-power lens having the power for near vision and that portion of a progressive-power lens having the power for distance vision, respectively. The difference between the near power and the distance power experienced by the wearer is called addition power. In a progressive-power lens there is a progression zone between the near vision zone and the distance vision zone in which the power experienced by the wearer progresses from the power for distance vision to the power for near vision and in which the vision for the wearer is clear. The length of the progression zone is called progression length.

The term "distance design reference point" refers to that point stipulated by the manufacturer, on the front surface of a finished spectacle lens or on the finished surface of a lens blank, at which the design specification for the distance vision zone apply (see DIN ISO 13666:2013-10, section 5.13).

The term "near design reference point" refers to that point stipulated by the manufacturer, on the front surface of a finished spectacle lens or on the finished surface of a lens blank, at which the design specification for the near vision zone apply (see DIN ISO 13666:2013-10, section 5.14).

The term "prescription data" or "individual prescription data" is used as a generic term for a set of optical characteristics of the spectacle lens according to a prescription, such as, power, addition power, refractive index, and progression length.

The term "freeform surface" refers to a surface which may freely be formed during the manufacturing process and which does not need to show axial symmetry or rotational symmetry. In particular, a freeform surface may lead to different powers in different sections of the surface. The use of freeform surfaces allows for improving the quality of spectacle lenses with regard to imaging quality experienced by the wearer, as the spectacle lens can be optimized with respect to individual prescription values of the wearer, as well as to individual centration and frame data. Freeform surfaces of progressive power lenses include a larger number of parameters, which may be taken into account in the calculation of the surface, than in the calculation of the freeform surfaces for single vision lenses, e.g., the progression length or the addition power.

The term "target design" describes a specification of the properties of a spectacle lens and/or of a surface of the spectacle lens. The properties may in particular, but not exclusively, include the distribution of power of the spectacle lens, distributions of optical aberrations in the beam path running through a spectacle lens, through the pupil and through the eye's center of rotation, and/or distributions of surface properties over a surface of the spectacle lens.

The term "starting target design" describes a target design used as a starting point for establishing a target design.

The term "graphical user interface" describes an interface of a computer program which contains graphical elements and/or icons which are used for inputting commands or data to the computer program. A graphical user interface may, e.g., include a manipulable pointer displayed on a display the location of which on the display can be controlled with an input device such as a mouse, a trackpad or a trackball. At the location of the pointer an activity can be initiated or selected by a defined action, such as, pressing a mouse button, tipping on the trackpad, or the like for selecting execution commands, opening menus, etc.

The term "as-worn position" refers to a position and orientation of the spectacle lens relative to the eyes and face during wear (see DIN ISO 13666:2013-10, sections 9.15) and includes at least values for the back vertex distance, the face form angle and the pantoscopic angle. The "face form angle" is the angle between the plane of the spectacle front and the plane of the right lens shape, or of the left lens shape, the term "pantoscopic angle" refers to an angle in the vertical plane between the normal to the first front surface of the spectacle lens at its boxed center, i.e., at the intersection of the horizontal and vertical center lines, and the term "back vertex distance" refers to the distance between the apex of the cornea and the rear surface of the spectacle lens in a defined viewing direction (see DIN ISO 13666:2013-10, sections 5.27 and 17).

The term "frame data" includes the geometry of the spectacle frame and the coordinates of the centration point (see DIN ISO 13666:2013-10, section 17).

In an exemplary embodiment of the device for establishing a target design the distribution of the at least one property of the starting target design is represented on the display by a distribution of contour lines.

In another exemplary embodiment of the device for establishing a target design, the device further includes a receiving interface for receiving the starting target design In yet another exemplary embodiment of the device for establishing a target design the distribution of the at least one property of the desired target design and/or the starting target design is at least one of the following: 1) a power distribution or an object distance model; 2) a distribution of at least one optical aberration present in the beam path running through the spectacle lens, the pupil of a wearer and the eye's center of rotation of the wearer's eye; 3) a distribution of at least one surface property of a surface of the spectacle lens to be produced; and 4) a distribution of zones of the spectacle lens to be produced.

In a further exemplary embodiment of the device for establishing a target design, the graphical user interface includes a weighting means allowing for manipulating the relative weighting of different properties and/or zones of the desired target design. This allows for defining relative importance between different properties or zones of the target design.

The graphical user interface allows to specify the desired target design by drawing lines on the display or manipulating lines displayed on the display and/or by drawing areas on the display or manipulating areas displayed on the display, where the lines and/or areas represent a distribution of at least one property of the desired target design and/or zones of the desired target design. Hence, the device for establishing a target design provides a means for an ECP which he can intuitively use for finding individual target designs which represent compromises in achieving as many of the desired, possibly contradictory, properties of a spectacle lens as possible. For experienced ECPs, the device even allows for directly drawing a desired target design from scratch.

According to another aspect of the present disclosure, a computer implemented method for establishing a target design for use in producing a spectacle lens is provided, which includes providing a graphical user interface on a display, the graphical user interface allowing to specify a desired target design by a user; providing a storage unit containing a number of target designs; and selecting, by means of a selecting device, out of the target designs contained in the storage a target design that matches a desired target design specified by the user by means of the graphical user interface the closest and providing the selected target design as an established target design.

The desired target design is specified by drawing lines and/or areas on the display and/or by directly manipulating lines and/or areas displayed on the display, which lines and/or areas represent a distribution of at least one property of the desired target design and/or zones of the desired target design.

The display may be a conventional display on which the graphical user interface displays a manipulative means such as a cursor or the like. In this case, drawing lines or areas on the display may be done by moving the cursor, e.g., by using a mouse, a trackball, a trackpad, a joystick, etc. Manipulating a line or an area, e.g., relocating or erasing a line or an area displayed on the display may be done by selecting the line or the area by use of the cursor in conjunction with a mouse, a trackball, a trackpad, a joystick, etc. and then moving the selected line by use of the cursor in conjunction with a mouse, a trackball, a trackpad, a joystick, etc., or erasing the selected line or area by use of an eraser function provided by the graphical user interface. However, the display may also be a touchscreen. In this case drawing lines or areas on the display may be done with a drawing device such as a pen or the like or using a finger. Manipulating a line or an area may be done by selecting a line or are with the drawing device (then acting as a pointing device) or the finger and relocating the selected line or are by moving the drawing device or the finger, respectively, or erasing the selected line or area by means of an eraser function provided by the graphical user interface.

In an exemplary embodiment of the method, the display displays a starting target design represented by lines and/or areas representing at least one property of the starting target design and/or zones of the desired target design. The desired target design is then specified by directly manipulating the lines and/or the areas of the starting target design displayed on the display. The lines displayed on the display may constitute a distribution of contour lines.

According to another exemplary embodiment of the method, the distribution of the at least one property of the desired target design and/or the starting target design is at least one of the following: a power distribution or an object distance model; a distribution of at least one optical aberration present in the beam path running through the spectacle lens, the pupil of a wearer and the eye's center of rotation of the wearer's eye; a distribution of at least one surface property of a surface of the spectacle lens to be produced; and a distribution of zones of the spectacle lens to be produced.

According to a further exemplary embodiment of the method, specifying the desired target design includes manipulating a relative weighting of different properties and/or zones of the desired target design. This allows for defining relative importance between different properties of the target design.

According to another aspect of the present disclosure, a computer program is provided on a non-transitory storage medium and containing program code for performing the method steps of the computer implemented method when the computer program is loaded in or executed by a computer.

BRIEF DESCRIPTION OF THE DRAWINGS

Further features, properties and advantages of the present invention will become clear from the following detailed description of exemplary embodiments of the invention in conjunction with the accompanying drawings.

DESCRIPTION OF EXEMPLARY EMBODIMENTS

Figure 1:
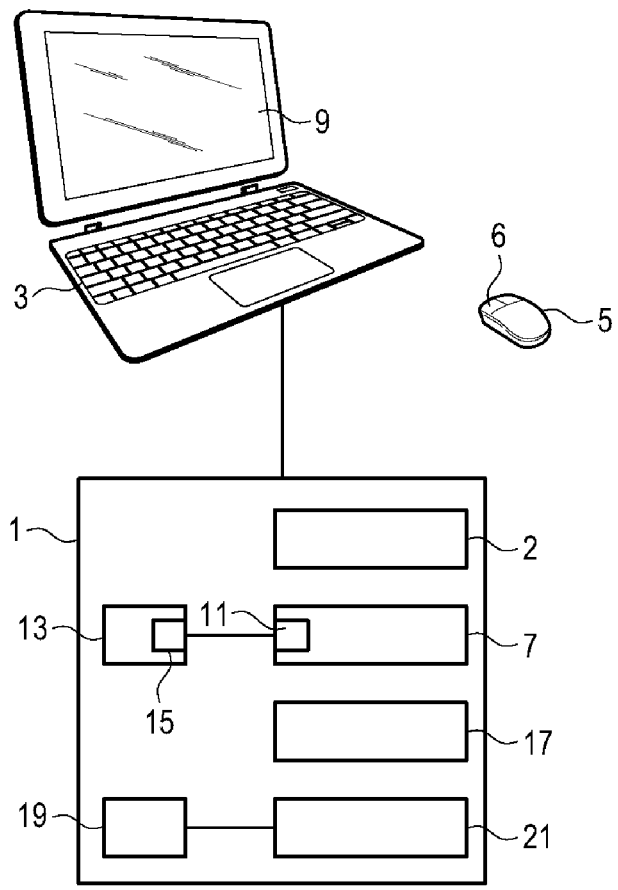
FIG. 1 schematically shows a device for establishing a target design for use in producing a spectacle lens.

An exemplary embodiment of a device for establishing a target design will be described with respect to FIG. 1. In particular, FIG. 1 schematically depicts the device 1 which is shown to be connected to a computer 3 with a mouse 5 as an input device for the computer. Although the device for establishing a target design is shown to be discrete device 1 connected to a computer 3, it is apparent to a person skilled in the art that the elements of the device, which will be described with respect to the present embodiment, can also be implemented by a software running on the computer 3. Then, the device for establishing a target design is implemented by the computer 3 itself with a respective program running on the computer.

With the help of the device 1 for establishing a target design, a user can establish a target design having one or more specific properties. In particular, a user can define a desired target design having of one or more specific aberrations and/or assigned power distributions and/or a distribution of surface properties for a spectacle lens, and/or the user can specify the importance of different aberrations and/or zones of the spectacle lens. In the present embodiment, defining a desired target design is done by use of a starting target design that is manipulated by use of a graphical user interface, as will be described later. However, in other embodiments defining a desired target design may be done by drawing lines and/or areas representing a desired aberration and/or a desired power distribution and/or a desired distribution of surface properties.

The device 1 for establishing a target design comprises a graphical user interface 2 that is displayed on the computer monitor 9. In the present embodiment, the graphical user interface 2 is controlled via the mouse 5 and at least one mouse button 6 for selecting execution commands, opening menus, etc. However, other devices for and methods of controlling the graphical user interface 2 are apparent to a person skilled in the art. For example, the graphical user interface 2 may be controlled by a touchscreen, a trackpad in conjunction at least one button, a trackball in conjunction with at least one button, a joystick in conjunction with at least one button, etc. Instead of the at least one button or mouse button 6, a speech recognition unit or a means for recognizing tipping on the touchscreen or the touchpad may be used as well for selecting execution commands, opening menus, etc. Moreover, controlling the graphical user interface by gestures is also conceivable.

In the exemplary embodiment of FIG. 1, the device 1 for establishing a target design further comprises a generator 7 for generating a graphical representation of a distribution of at least one property of a starting target design and for displaying the graphical representation on the computer display 9. In the exemplary embodiment, graphical representations of the following properties of the target design can be generated:

A power distribution or an object distance model. This can be a simple as specifying prescription data, or can include, e.g., progression length or a power profile, or can be as detailed as specifying object distances or power values over the entire spectacle lens.

A distribution of one or more optical aberrations for the wearer of the lens, i.e., aberrations in the beam path running through the spectacle lens, the pupil of the wearer and the eye's center of rotation of the wearer's eye. The one or more optical aberrations may include, for example, astigmatic error, power error, prism, or even higher order errors such as coma.

A distribution of surface properties of a free-form surface such as surface astigmatism.

Relative importance of zones and/or aberrations and/or surface properties of the free-form surface and/or power distributions.

In the exemplary embodiment, the generator 7 includes a receiving interface 11 for receiving a starting target design for which a graphical representation of a distribution of at least one property of the starting target design is generated and displayed on the display 9. A plurality of different designs may be used as starting target designs. The plurality of starting target designs may be stored in a starting target design storage unit 13, which is connected to the receiving interface 11 of the generator 7 through a storage interface 15. For selecting one of the plurality of target designs stored in the starting target design storage unit 13, a selecting unit 17 is provided. In the simplest case, the selecting unit reads the contents of the starting target design storage unit 13 and provides an output on the display 9 including a listing of the target designs so that the user of the device can choose one of the target designs present in the list by using the mouse 5 and the mouse button 6. Instead of a list, graphical representations of the starting target designs present in the starting target design storage unit 13 may be presented to the user.

The graphical user interface 2 and the mouse 5 provide a manipulating means for manipulating the graphical representation of the distribution of one or more properties of the starting target design displayed on the display 9. This allows the user to change the properties present in the starting target design so as to adapt the starting target design to become the desired target design.

Moreover, the device 1 includes a storage 19 and a selecting device 21. The storage unit 19 contains a large number of different target designs. The target designs may be ordered in the storage unit 19 in form of a multi-dimensional matrix where each dimension of the matrix is represented by an index given to the matrix elements, i.e. the target designs. Each index stands for a parameter characterizing a feature of the target design (Rx, progression length, addition power, hard/soft balance, material, etc.), and the value of the respective index stands for a value of the respective parameter. In the present embodiment, all indices of the matrix are ordered such that an increasing index value corresponds to an increasing parameter value so that neighboring target designs in the matrix only differ slightly from each other while target designs being located further apart in the matrix show larger differences between them. The denser the target designs in the multi-dimensional matrix are, the closer can the target design selected by the selecting device match any desired target design. Based on the desired target design the selecting device 21 selects, out of the large number of target designs stored in the storage unit 19, the target design that matches the desired target design the closest. The selecting may be based on numerical methods such as, for example neural networks. However, simpler algorithms would also be possible. Once the target design is selected in this way, it is provided as an established target design and a numerical optimization of the freeform surface can be executed based on the established target design, including all individual parameters such as position of wear and frame data, which are then used for manufacturing the spectacle lens.

Figure 2:
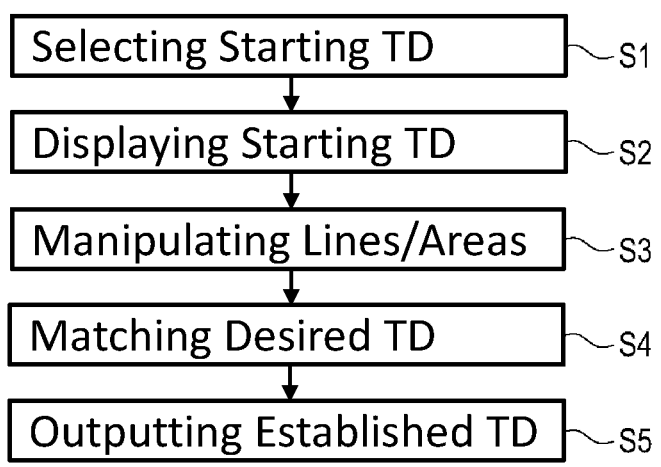
FIG. 2 shows a chart representing a method for establishing a target design for use in producing a spectacle lens.

The inventive method for establishing a target design will now be described with respect to FIG. 2.

In step S1 of the method a user selects a suitable starting target design (TD). Once the starting target design is selected it is displayed on the display 9 (step S2). On the display, the starting target design is represented by lines and/or areas representing a distribution of at least one property of the starting target design, In the present embodiment, the lines and/or areas form of a contour plot which may represent a distribution of a specific aberration and/or a power distribution and/or a distribution of a surface property. Alternatively or additionally, the lines and/or areas may represent borders of zones (for distance vision, intermediate vision and near vision) that can be moved by use of the cursor so that specific zones can be increased or diminished.

Then, in step S3 the user may use the graphical user interface 2 and the mouse 5 for manipulating the lines and/or areas displayed on the display 9 so as to change the properties of the starting target design in order to improve the starting target design in view of the desired target design. For an expert like, for example, a lens designer, it may even be possible that the graphical user interface 2 provides a drawing tool by which the user is able to draw lines and/or areas indicating distributions of properties and/or borders of zones of a target design. In this case, the selection of a starting target design is not necessary or the starting target design could as well be a blank without any lines and/or areas so that the relevant lines and/or areas need to be added by the expert. However, typically a starting target design would include at least some lines and/or areas like, for example, contour lines representing a power distribution, and the expert could add for example contour lines representing a distribution of the astigmatic error. For a less experienced user, the starting target design would include lines and/or areas for all necessary properties and the user would amend the properties by, for example, manipulating contour lines of the respective properties or moving areas representing zones like zones for distance vision, intermediate vision, and near vision.

After the starting target design has been manipulated to become the desired target design, a selection device selects out the large number of target designs in the storage 19 the target design which matches the desired target design the closest (step S4). The more dense the number of target designs stored in the above mentioned matrix is, the better the matching between the selected target design and the desired target design takes place. Finding the desired target design can be done, e.g., by neural networks, thereby minimizing a cost function representing the deviation between a target design and the desired target design.

After the closest target design has been selected in step S4, the selected target design is output as the established target design in step S5.

Figure 3:
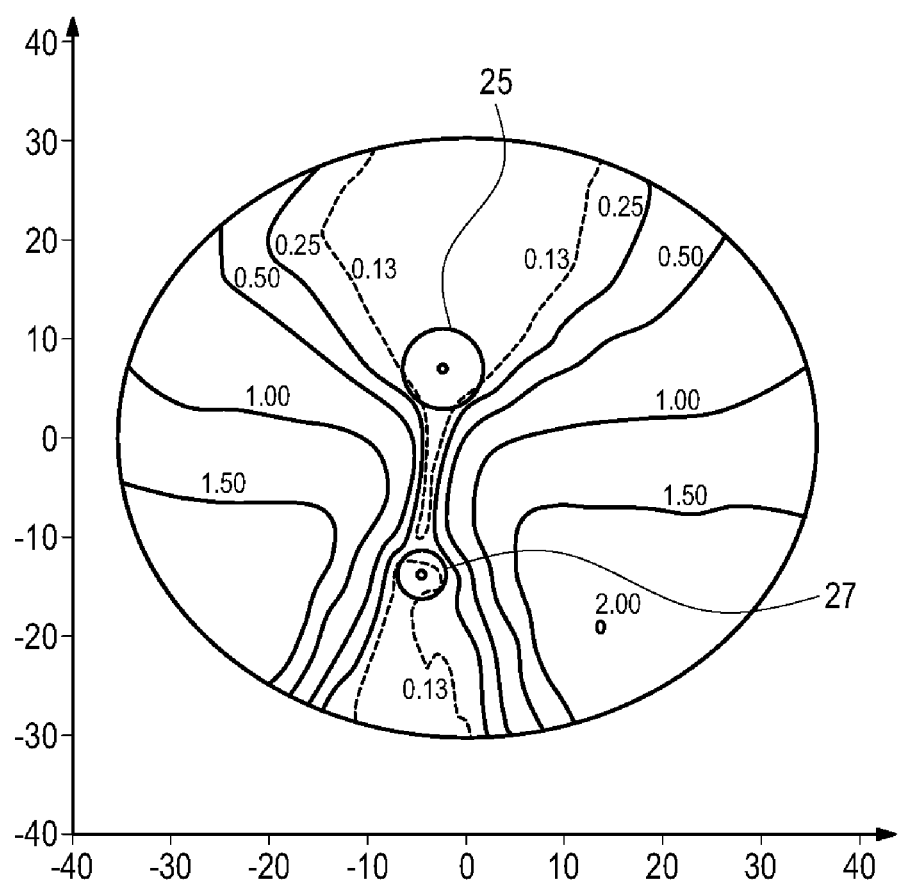
FIG. 3 shows the distribution of the astigmatic error in a target design.

An example for a target design which can be produced by use of the disclosed method and the disclosed device will be described with respect to FIGS. 3 to 5. FIG. 3 shows a graphical representation of a property, namely the astigmatic error distribution, of a desired target design specified by a user of the device for establishing a target design. The astigmatic error distribution is represented by contour lines where each contour line represents equal values of the astigmatic error provided by the starting target design. Also shown in FIG. 3 are the distance design reference point 25 and the near design reference point 27.

Furthermore, in the desired target design the distance design reference point providing a power of 0.00 diopter and an addition power of 2.5 diopter is present. The power experienced by the wearer progresses from the distance design reference point 25 to the near design reference point 27 by 2.5 diopter. The power profile by which the addition power should increase is shown in FIG. 4.

Figure 4:
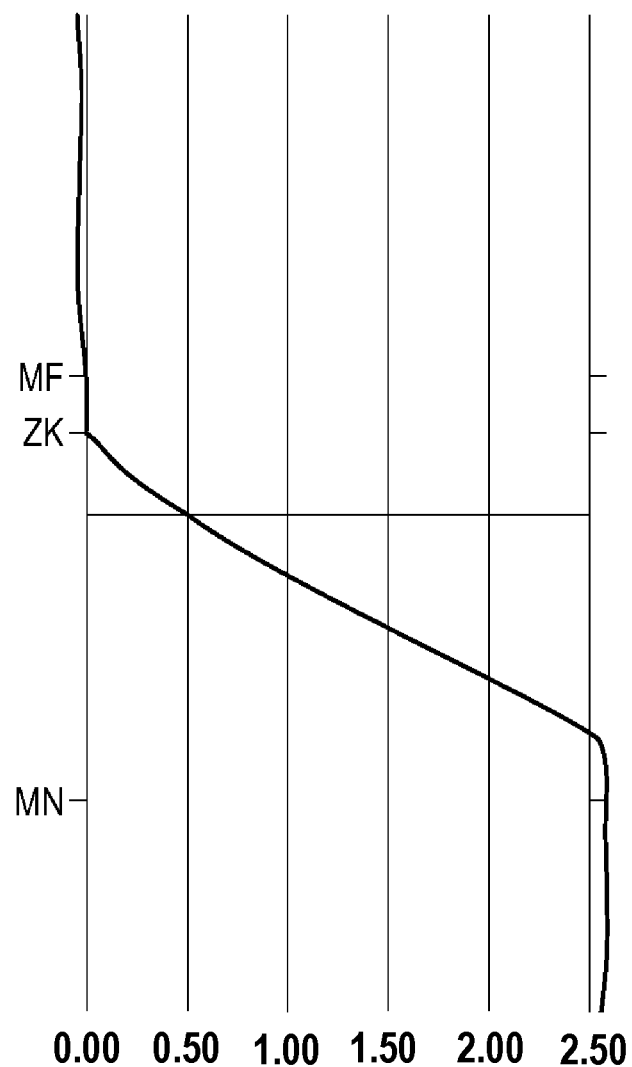
FIG. 4 shows a power profile specified for a spectacle lens with a prescription of sphere 0.0 D at 2.5 D.
Figure 5:
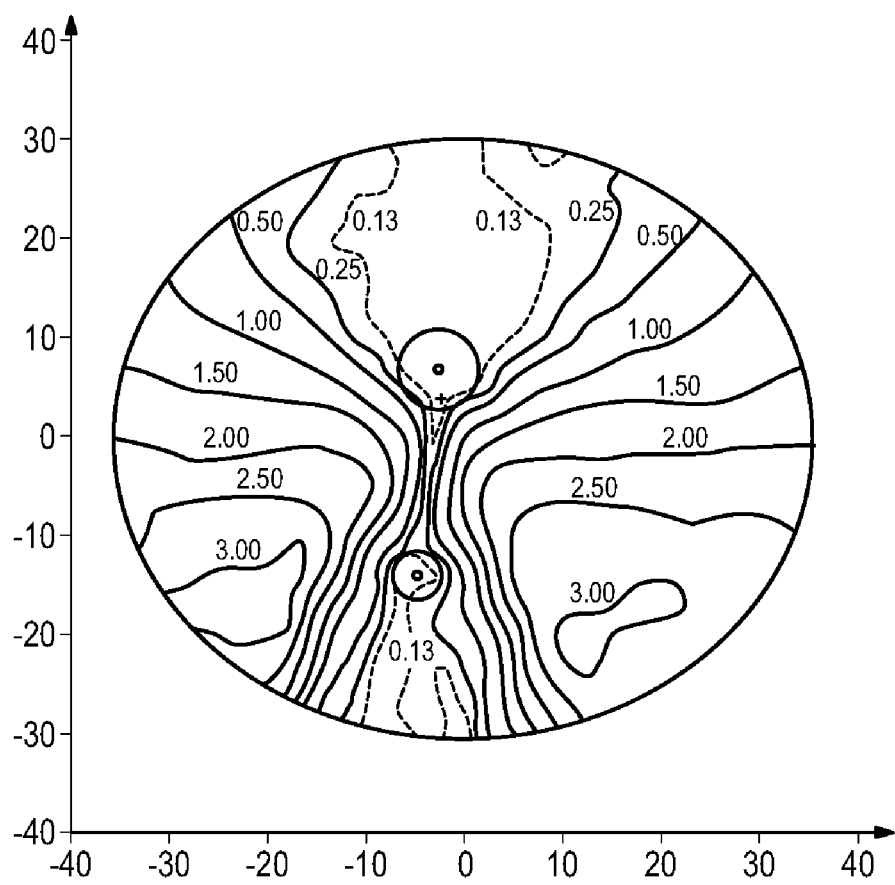
FIG. 5 shows the astigmatic error distribution of a target design which is a compromise between the astigmatic error distribution of the target design shown in FIG. 3 and the power profile shown in FIG. 4.

However, the astigmatic error distribution of the desired target design shown in FIG. 3 has too wide a corridor so that a spectacle lens with the astigmatic error distribution shown in FIG. 3 and, at the same time, the power profile shown in FIG. 4 cannot be produced because the Minkwitz theorem is not fulfilled.

Based on the specifications of the desired target design as shown in FIGS. 3 and 4, the selection device selects a target design which matches the specifications of the desired target design the closest and at the same time fulfills the Minkwitz theorem. The astigmatic error distribution of the selected target design is shown in FIG. 5. The selected target design then forms the established target design which is used for producing the spectacle lens, The present disclosure has been described with respect to specific embodiments for illustrative reasons. However, it is apparent to a person skilled in the art that deviations from the described embodiments are possible. For example, the graphical representation of the properties can be in form of colors presenting zones with values of the respective property in a certain range. In FIG. 3, for example, the areas between neighboring contour lines in FIG. 3 would then show different colors or shades of grey, and the contour lines would be omitted. Other possible graphical representations will be apparent to a person skilled in the art.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A device for establishing a target design, comprising:
   a display;
   a graphical user interface provided on the display, the graphical user interface being configured to specify a desired target design by a user;
   a storage unit including a plurality of target designs; and
   a selecting device for selecting, out of the plurality of target designs contained in the storage unit, a target design that most closely matches a desired target design specified by the user through the graphical user interface, which is then provided as an established target design;
   wherein the graphical user interface allows to specify the desired target design by drawing lines, areas, or lines and areas on the display, wherein the lines, areas, or lines and areas represent a distribution of at least one property of the desired target design, zones of the desired target design, or at least one property of the desired target design and zones of the desired target design.

2. The device as claimed in claim 1, wherein:
   the graphical user interface is configured to display a starting target design on the display, the starting target design being represented by lines, areas, or lines and areas representing a distribution of at least one property of the starting target design, zones of the desired target design, or at least one property of the starting design and zones of the desired target design; and
   the graphical user interface is configured to directly manipulate the lines, areas, or lines and areas of the starting target design displayed on the display.

3. The device as claimed in claim 2, further comprising a receiving interface for receiving the starting design.

4. The device as claimed in claim 2, wherein the lines displayed on the display are a distribution of contour lines.

5. The device as claimed in claim 1, wherein the distribution of the at least one property of the desired target design, starting design, or desired target design and starting target design is at least one of the following:
   a power distribution or an object distance model;
   a distribution of at least one optical aberration present in the beam path running through the spectacle lens, the pupil of a wearer, and the center of rotation of the wearer's eye;
   a distribution of at least one surface property of a surface of the spectacle lens to be produced; and
   a distribution of zones of the spectacle lens to be produced.

6. The device as claimed in claim 1, wherein the graphical user interface includes a weighting means allowing to manipulate the relative weights of different properties, different zones, or different properties and different zones of the desired target design.

7. A method for establishing a target design comprising:
providing a graphical user interface on a display, the graphical user interface being configured to specify a desired target design by a user;
providing a storage unit containing a plurality of target designs;
specifying the desired target design;
matching the desired target design to a target design from among the plurality of target designs; and
selecting with a selecting device the target design from among the plurality of target designs that most closely matches the desired target design as an established target design;
wherein the desired target design is specified by drawing lines, areas, or lines and areas on the display wherein, the lines, areas or lines and areas represent a distribution of at least one property of the desired target design, zones of the desired target design, or at least one property of the desired target design and zones of the desired target design.

8. The method as claimed in claim 7, wherein the display of the graphical user interface displays a starting target design represented by lines, areas, or lines and areas representing a distribution of at least one property of the starting target design, zones of the desired target design, or at least one property of the target design and zones of the desired target design and the desired target design is specified by directly manipulating the lines, areas, or lines and areas of the starting target design displayed on the display.

9. The method as claimed in claim 7, wherein the lines displayed on the display are a distribution of contour lines.

10. The method as claimed in claim 7, wherein the distribution of the at least one property of the desired target design, starting design, or target design and starting target design is at least one of the following:
a power distribution or an object distance model;
a distribution of at least one optical aberration present in the beam path running through the spectacle lens, the pupil of a wearer and the eye's center of rotation of the wearer's eye;
a distribution of at least one surface property of a surface of the spectacle lens to be produced; and
a distribution of zones of the spectacle lens to be produced.

11. The method as claimed in claim 7, wherein specifying the desired target design includes manipulating a relative weighting of different properties of the desired target design, zones of the desired target design, or properties and zones of the desired target design.

12. A computer program stored on a non-transitory storage medium, the computer program comprising program code for performing the method according to claim 7 when the computer program is loaded or executed in a computer.

13. A device for establishing a target design, comprising:
a display;
a graphical user interface provided on the display, the graphical user interface being configured to specify a desired target design by a user;
a storage unit including a plurality of target designs; and
a selecting device for selecting, out of the plurality of target designs contained in the storage unit, a target design that most closely matches a desired target design specified by the user through the graphical user interface, which is then provided as an established target design;
wherein the graphical user interface allows to specify the desired target design by directly manipulating lines, areas, or lines and areas displayed on the display by performing at least one of relocating, adding, or erasing at least parts of the lines, areas, or lines and areas, wherein the lines, areas, or lines and areas represent a distribution of at least one property of the desired target design, zones of the desired target design, or at least one property of the desired target design and zones of the desired target design.

14. A method for establishing a target design comprising:
providing a graphical user interface on a display, the graphical user interface being configured to specify a desired target design by a user;
providing a storage unit containing a plurality of target designs;
specifying the desired target design;
matching the desired target design to a target design from among the plurality of target designs; and
selecting with a selecting device the target design from among the plurality of target designs that most closely matches the desired target design as an established target design;
wherein the desired target design is specified by directly manipulating lines, areas, or lines and areas displayed on the display by performing at least one of relocating, adding, or erasing at least parts of the lines, areas, or lines and areas;
wherein the lines, areas, or lines and areas represent a distribution of at least one property of the desired target design, zones of the desired target design, or at least one property of the desired target design and zones of the desired target design.

* * * * *